United States Patent

Thornton et al.

[15] 3,667,064

[45] May 30, 1972

[54] POWER SEMICONDUCTOR DEVICE WITH NEGATIVE THERMAL FEEDBACK

[72] Inventors: Richard D. Thornton, Concord; John M. Borky, Hull, both of Mass.

[73] Assignee: Massachusetts Institute of Technology, Cambridge, Mass.

[22] Filed: May 19, 1969

[21] Appl. No.: 825,491

[52] U.S. Cl. ..............330/23, 307/303, 307/310, 330/38 M

[51] Int. Cl. ..............H03f 3/14

[58] Field of Search ..............330/23, 38 R, 38 M; 307/303, 307/310

[56] References Cited

UNITED STATES PATENTS

| | | | |
|---|---|---|---|
| 3,258,606 | 6/1966 | Meadows | 330/38 UX |
| 3,383,614 | 5/1968 | Emmons et al. | 330/38 X |
| 3,393,870 | 7/1968 | Jeffrey | 330/38 X |

FOREIGN PATENTS OR APPLICATIONS

| | | | |
|---|---|---|---|
| 951,342 | 3/1964 | Great Britain | 330/23 |

*Primary Examiner*—Roy Lake
*Assistant Examiner*—James B. Mullins
*Attorney*—Thomas Cooch, Martin M. Santa and Robert Shaw

[57] ABSTRACT

A composite power semiconductor is disclosed which is adapted to avoid second breakdown and therefore provide stable operation. The composite semiconductor consists of an array of parallel-connected integrated circuits constructed in a single chip, each circuit comprising an output power device, for connection between an electric power source and a load, and one or more associated low-level control amplifiers. The effect of the thermal instability called second breakdown in such an array is to channel a disproportionate amount of electric current through the output device undergoing second breakdown, thereby increasing the temperature of the affected output device, thereby increasing the current, etc. until failure occurs. In the power semiconductor disclosed, the output power device and associated low-level amplifier are thermally closely coupled so that each is at all times substantially at the temperature of the other or bears a predetermined temperature relationship therewith, and the two are interconnected in a fashion that will produce high electrical gain. There is negative thermal feedback so that a change in power dissipation with resulting temperature change in the output device causes the low-level amplifier to alter the electric current carried by the output device. For example, an increase in temperature which will tend to cause the output device to conduct a larger amount of electric current and which will also tend to cause the low-level amplifier to conduct a larger amount of current, can have the result, because of the close thermal coupling and interconnection, of maintaining the output current substantially constant.

14 Claims, 9 Drawing Figures

INVENTORS:
JOHN M. BORKY
RICHARD D. THORNTON
BY Robert Shaw
ATTORNEY

INVENTORS:
JOHN M. BORKY
RICHARD D. THORNTON
BY Robert Shaw
ATTORNEY

INVENTORS:
JOHN M. BORKY
RICHARD D. THORNTON
BY Robert Shaw
ATTORNEY

POWER SEMICONDUCTOR DEVICE WITH NEGATIVE THERMAL FEEDBACK

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The present invention relates to thermally stable power semiconductors, including transistors, semiconductor controlled rectifiers and the like.

Power transistors are generally multi-emitter devices or multi-transistors, parallel connected. One of the greatest drawbacks of transistors when used in power circuitry is the incidence of failure due to second breakdown because of an inherent temperature instability in such devices. Thus, an increase in temperature, however caused, at one region of the transistor leads to a disproportionate electric current flow through that region, which leads to a further increase in the temperature of the region, etc., until failure occurs; or the instability may be initiated by an excess current in one emitter finger or region with accompanying temperature rise, the cycle continuing due to positive thermal feedback until all the current flows through the one region. A thermally unstable region or hot spot will be present even in ideal device structures, while imperfections, such as non-uniform base thicknesses or header voids, for example, will aggravate the instability problem. Whether the power transistors are multi-emitter devices or parallel-connected multi-transistor devices, the problem of second breakdown exists. One proposed solution to the problem is to introduce resistances in series with the emitters thereby to provide automatic transfer of load from a thermally unstable region. Unfortunately, this is a current-sensing mechanism, electrical instead of thermal in nature, and is least effective in the low-current, high-voltage operation range where second breakdown is most troublesome.

Accordingly, an object of the present invention is to provide a thermally stable semiconductor device capable of carrying power currents at high voltages, i.e., above about 40 volts $V_{CE}$.

Another object is to provide a power semiconductor in which the occurrence of second breakdown is removed or reduced.

Still another object is to provide a power semiconductor embodying output and control means and in which there is close thermal coupling between the two, there being negative thermal feedback whereby the electric current carried by a particular output means is controlled to prevent the runaway condition that exists in second breakdown.

Still another object is to provide said close thermal coupling in a semiconductor device in which the power and control means are fabricated in a single wafer, the configuration being appropriate to provide the desired coupling.

A further object is to provide thermally stable power semiconductors in which both the output and the control devices are transistors.

Other and still further objects are evident in the description to follow and are delineated in the appended claims.

Byway of summary, the objects are attained in a thermally stable composite power semiconductor comprising an array of parallel-connected integrated circuits, fabricated in a single chip, each integrated circuit having an output power device (whose electric current carrying characteristics are altered by temperature variations) and an associated low-level amplifier (whose electric current characteristics are also altered by temperature variations) in close enough proximity thereto that the temperature of the output device is at all times substantially equal to or bears a predetermined relation to the temperature of the associated low-level amplifier, i.e. there is good thermal coupling therebetween. The temperature of the output device, and, thus, the temperature of the associated low-level amplifier, is determined in part by the magnitude of electric power dissipated by the output device. The output device and the associated low-level amplifier are interconnected in such fashion as to produce high electrical gain, the thermal coupling producing negative feedback so that a change in power dissipation which produces an abnormal temperature condition in the output device causes a change in the low-level amplifier which acts to alter the electric current carried by the output device.

The invention will now be explained in connection with the accompanying drawing, in which.

Figure 1:
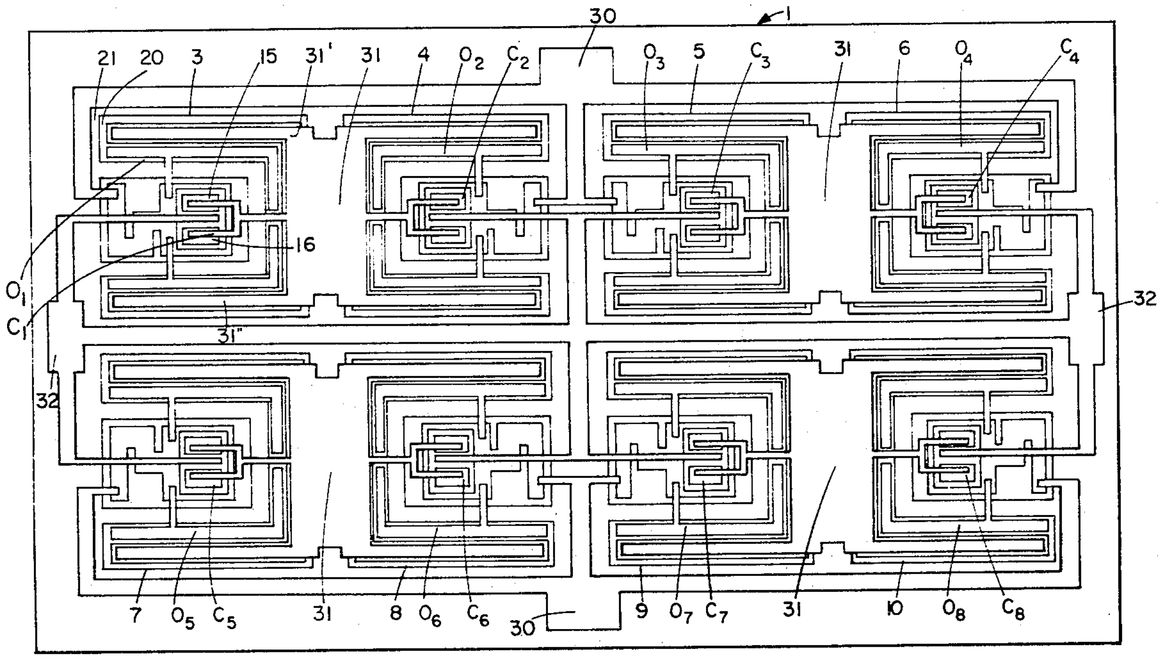
FIG. 1 is a line sketch plan view of a composite power semiconductor embodying the inventive concept herein disclosed and showing a plurality of output devices and associated low-level amplifiers.
Figure 5:
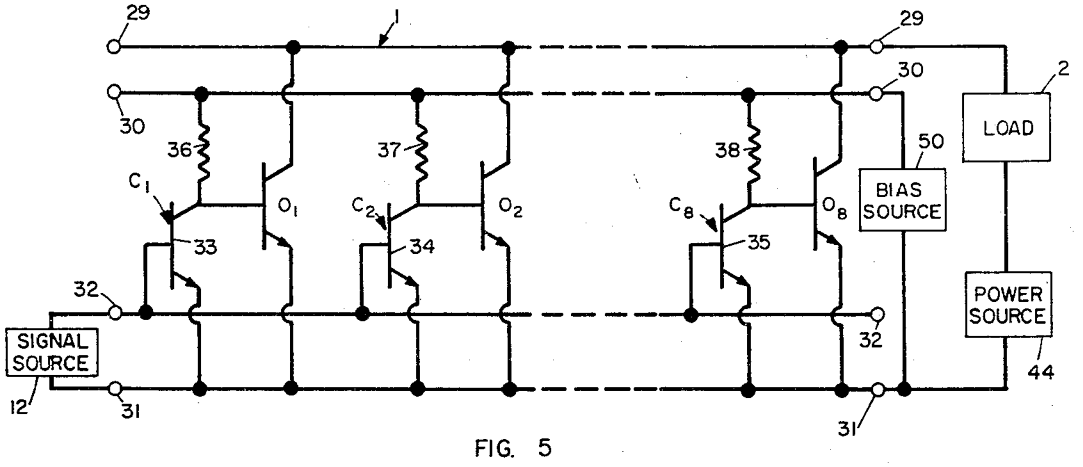
FIG. 5 is a schematic representation of an array of integrated circuits, each circuit comprising an output transistor and an associated control transistor.

Referring now to the drawings, a composite power semiconductor is shown at 1 in FIG. 1 comprising a single-chip array of parallel-connected integrated circuits more particularly shown in FIG. 5. Each integrated circuit includes an output power device, as, for example, the transistors designated $O_1$, $O_2$ . . . $O_8$ and respective associated low-level control amplifiers $C_1$, $C_2$ . . . $C_8$ (comprising transistors 33, 34 and 35 and bias resistances 36, 37 and 38, respectively, in combination) in close enough proximity thereto that the temperature of the output device is at all times substantially equal to (or bears a predetermined relationship to) the temperature of the associated low-level amplifier. Since the output devices and associated control amplifiers function alike in each instance, the explanation to follow, for simplicity, will be made with reference to the output device $O_1$ and its associated low-level amplifier $C_1$, it being kept in mind that the other output and control means function similarly. Also, the discussion immediately following relates to transistor combinations although, as discussed, other types of semiconductors can be used, as well.

Figure 9:
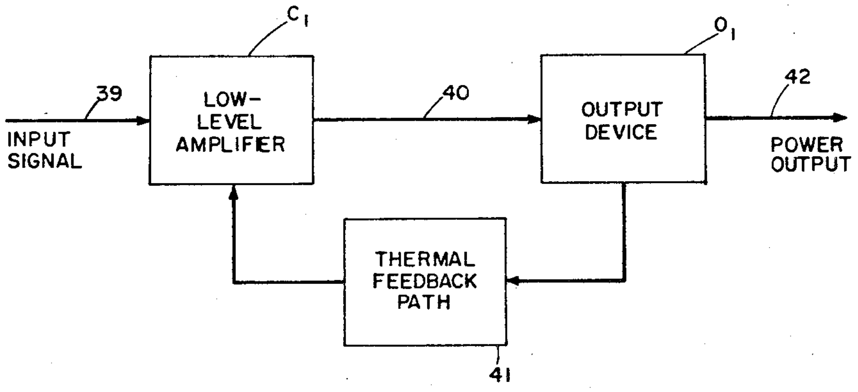
FIG. 9 is a schematic representation of heat flow in the power semiconductor disclosed.

Previous mention has been made that the current carrying characteristics of the output transistor $O_1$ are altered by temperature variation. The associated control transistor 33, whose characteristics are also altered by temperature, is fabricated in the chip in close enough proximity to the output transistor that the temperature of the output transistor $O_1$ is at all times substantially equal to the temperature of the associated control transistor 33, or bears some predetermined relationship thereto. The temperature of the transistors $O_1$ and 33 is determined by the ambient temperature and other factors, but it is determined in part, also, by the magnitude of power dissipation in the output transistor $O_1$. The low-level amplifier $C_1$ has an input designated 39 in FIG. 9 and an output 40, the latter of which, as later discussed in detail, is connected to the control terminals of the output transistor $O_1$. There is negative thermal feedback, designated 41, between the output shown at 42 of the output device and the input 39 of the low-level amplifier $C_1$, so that a change in power dissipation in the transistor $O_1$ causes a change in the low-level amplifier $C_1$ which acts to alter the electric current carried by the output transistor $O_1$. Thus a change in the temperature of the transistor $O_1$, however caused, which tends, for example, to result in an increased electric current in the output transistor $O_1$ (and which will tend to cause an increased electric current in the transistor 33), will not result, necessarily, in an increased current in the transistor $O_1$ because the interconnection of the two transistors, as now explained, has the effect of tending to decrease the current in $O_1$, in the circumstance.

Turning now to FIG. 5, the foregoing condition is one in which an increase in temperature of the transistor $O_1$ results in a tendency to increase load current through $O_1$ between electric power source terminals 29 and 31. Since the transistor 33 is at about the same temperature as $O_1$, it tends to conduct more current also. In other words, both of the transistors $O_1$ and 33 present a lower resistance to the flow of current between input terminals 29–31 and 30–31, respectively. This lowering of resistance of the control transistor 33, has the effect of lowering the base-to-emitter potential difference of the transistor $O_1$ thereby tending to lower the collector current thereof. The amount of resistance placed at 36, together with the bias voltage supplied by a bias source 50, determines the operating point of the output transistor both by biasing the base thereof and by controlling current through the control transistor 33. In order to be effective to control the transistor $O_1$, the low-level amplifier $C_1$ must produce high electrical gain between its input 39 and its output 40. Only a high-gain amplifier will produce results on the microseconds time scale required to protect the transistor $O_1$ against second breakdown, and, as mentioned, close thermal coupling is required.

Figure 4:
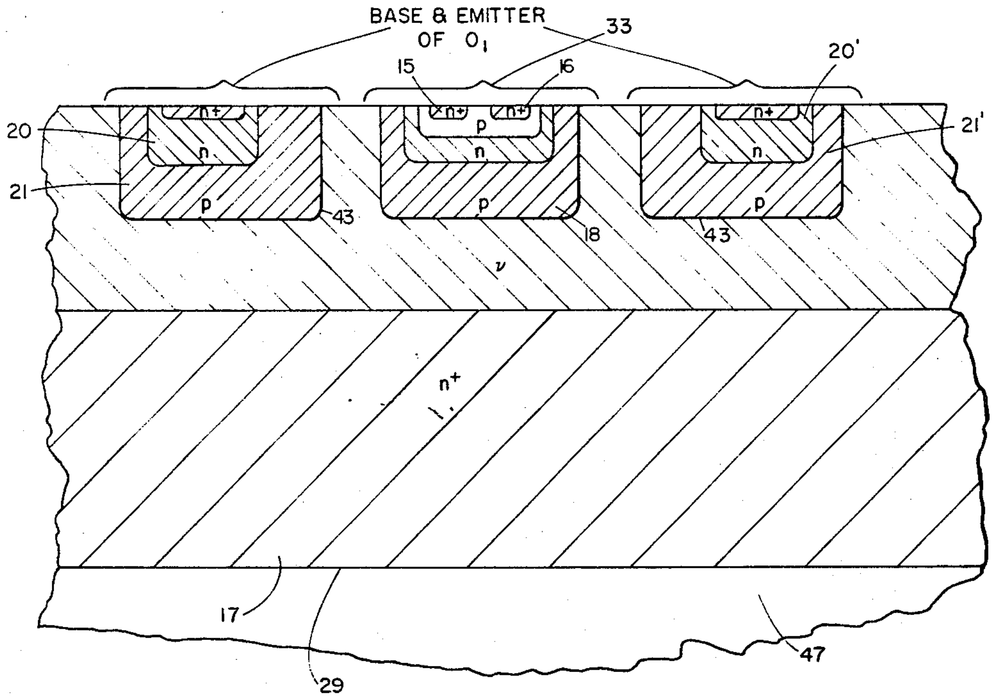
FIG. 4 is a view taken upon the line 4—4 in FIG. 3 looking in the direction of the arrows.

The array of which the power transistor is made consists of a plurality of small, electrically independent elements 3–10 in FIG. 1 (the transistors $O_1$ and 33 and the resistance 36 making up the element 3, $O_2$ and 35 and resistance 37 making up the element 4, etc.) fabricated by diffusion, epitaxial growth or alloying in a silicon wafer. The control transistor and associated output transistor are fabricated so that the active portions of each are close enough to one another to insure substantial equality of temperature at all times. The transistors, in a preferred embodiment, are constructed, as shown in FIG. 4, as N-P-I-N structures for the output transistors and N-P-N structures for the control transistors. The total device shown is a six-layer device with four diffusion steps in a wafer consisting of a substrate layer and an epitaxial layer. Electrical isolation between the control transistor 33 and the output transistor $O_1$ is provided by the p region designated 18. The overall thickness of the device is about 10 mils; the epitaxial wafer which forms the collector region of all the output devices $O_1$, $O_2$, etc., consists of a heavily doped *n* region some 8 mils thick in an operable device and there is a lightly-doped 2 mil epilayer $\nu$, as shown in FIG. 4.

Figures 2, 3:
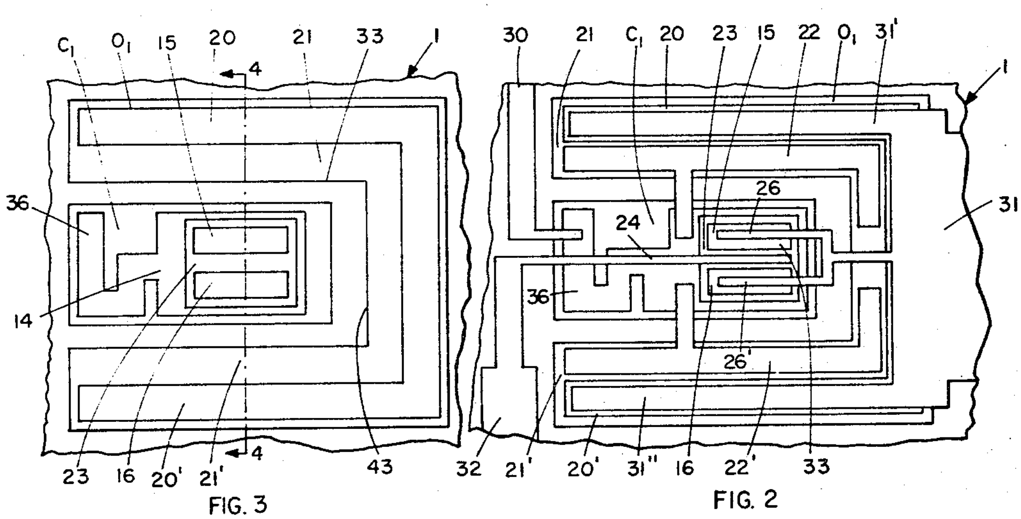
FIG. 2 is a line sketch, plan view on an enlarged scale, of one of the output devices of FIG. 1 and its associated low-level amplifier, particularly to show metalized conductive portions at the upper surface of the power semiconductor.
FIG. 3 is a view, similar to FIG. 2 except that the metalized portions at the upper surface of the semiconductor have been stripped away to expose the outline of diffusion regions in the semiconductor.

Electrical interconnection between the transistors making up one element and between elements of the array is effected using integrated circuit techniques, all but the main power connection being thin film aluminum or some other conductor deposited upon the upper surface of the composite structures, as particularly shown in FIG. 2. The transistor $O_1$ in FIGS. 3 and 4 is shown having emitter regions 20 and 20' (to which external connections are made through the thin film conductors shown at 31' and 31'' in FIGS. 1 and 2), base regions 21 and 21' (having inputs thereto through thin films 22 and 22'), and a collector region which, as mentioned, is the substrate of the composite device and is the region numbered 17 in FIG. 4. The transistor 33 has a base region 23 (to which connections are made by a thin film 24), emitter regions 15 and 16 (to which connections are made by thin film leads 26 and 26', respectively), and a collector region 14 adjacent to regions 15 and 16. The bias resistance 36 (as well as the further resistance 37, 38, etc.) is also fabricated by diffusion in the wafer.

Previous mention has been made of thermal coupling between the output 42 of the transistor $O_1$ and the input 39 to the low-level amplifier $C_1$ which is the base region of the associated control transistor. The main source of power dissipation in the output device when operating in the active region and therefore the main source of heat therein, is the base-to-collector junction labeled 43 in FIGS. 3 and 4. The thermal feedback path is between the junction 43 and the base region 23 of the transistor 33. As shown in FIGS. 3 and 4, the base 23 is substantially enclosed within the junction region 43, the average distance for heat travel between the junction and the base 23 being of the order of 2 mils in an operable device. For best results the length of the feedback path 41 should be short compared to the length of the path of heat travel through the wafer to a heat sink 47. In said operable device, as mentioned, the various semiconductors, bias resistances and conductors are fabricated in a silicon wafer, and the final device is about 10 mils thick; the length of the path of travel of heat to the heat sink 47 in such device is the order of 8 to 10 mils. For best results the average length of the feedback path should be one-half or less of the average distance to the heat sink 47 from the junction 43.

Figure 8:
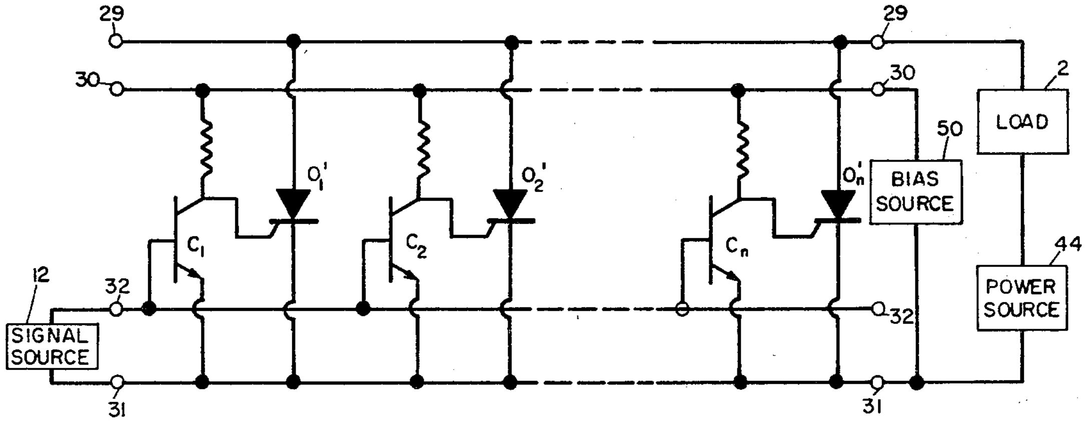
FIG. 8 is a schematic representation of an array of integrated circuits, each circuit comprising an output semiconductor controlled rectifier and an associated control amplifier.

The foregoing description has principally concerned apparatus containing transistors as both output and control devices. As mentioned, the present concept is useful in connection with other output devices, as well. In FIG. 8 the power semiconductor shown comprises a plurality of gate-turnoff silicon controlled rectifiers $O_1'$, $O_2'$, etc., as output devices, the associated low-level amplifiers $C_1$, $C_2$, etc. being connected between the gate and cathode electrodes of each of the rectifiers; the thermal feedback is effective to prevent second breakdown during a turnoff transient.

In FIGS. 5 and 8 the power semiconductors are connected to a load 2, a power source 44 providing the power for the load. A signal source 12 acts to control current through the output devices; i.e., current through the transistors $O_1$, $O_2$, etc. can be increased or decreased or shut off depending on the bias applied by the associated low-level amplifier, and the rectifiers $O_1'$, $O_2'$, etc. are biased on or off by the associated control transistor. External connectors are wire-bonded between the bonding pads provided in the metallization on the chip and the leads of the package (header). Connections to the emitters of both low-level and output transistors is made to the areas marked 31 in FIG. 1. Connections to the bias resistances and transistor bases of the low-level amplifier are made to the areas marked 30 and 32, respectively. Connection to the substrate 17 is made through the header at 29 in FIG. 4.

Figure 7:
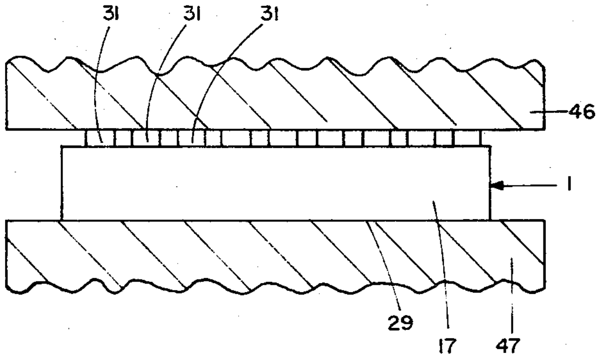
FIG. 7 shows a power semiconductor mounted between two heat sinks which form the device package and act as input terminals thereto.

One problem encountered in the use of the present device occurs at the connection between the source 11 and the power semiconductor. In FIG. 7 such connection is effected through heat sinks 47 and 46 which constitute major elements of the package of the device, the heat sinks providing the terminals 29 and 31, respectively, through which a load passes into and out of each of the output devices $O_1$, $O_2$, etc. The heat sink 47, as shown, is electrically and thermally coupled to the substrate 17 which, as mentioned, is the collector of the output devices $O_1$, $O_2$, etc.; and the heat sink 46 is coupled to the emitters of both the output devices and the control transistors associated therewith. This connection is made by metal pads which are deposited upon the emitter regions 31.

Composite semiconductors embodying the present inventive concept and consisting of a 4 × 2 array of elements on a 40 × 90 mil chip have been made; the individual elements are about 15 mils square. The critical thermal path between the output power device $O_1$ and its associated low-level amplifier, as mentioned, is significantly shorter than the other important thermal path of the device, i.e., the thermal path through the chip between the output power device and a heat sink. Typically the negative feedback path in a 10 mil thick chip is of the order of 2 mils, as before discussed herein. Line widths and spacing of about 0.25 mils are employed and this is feasible in practice using photolithographic processing. In order to prevent leakage current between the collector to base junctions of the output transistors, a relatively high level of doping (of the order of $10^{16}cm^{-3}$) is used. The diffused layers are made with two dopants, boron for the P-type layers and phosphorus for the N-type layers. The concentration and junction depth of each layer are determined by the temperature and time of the diffusion process. Diffusions, as is well known, are done in special, high-temperature furnaces in which wafers being processed are exposed to flowing gas which contains the dopants. Oxide masking using patterns created by standard photoresist techniques, are used to determine the areas on the wafer in which diffusion occurs. Temperatures and times for the process range from 800° to 1,200° C and from several minutes to several hours.

Figure 6:
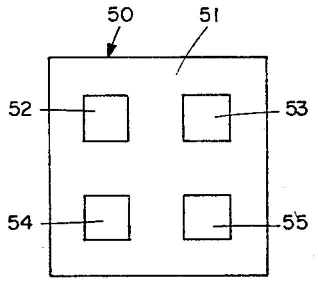
FIG. 6 is a plan view of a modification of the power semiconductor of FIGS. 1–5 in which each output device has associated therewith a plurality of control amplifiers.

In the embodiment previously discussed one output device and one control amplifier per element are shown, the control amplifier being disposed within and substantially surrounded by the associated power device thereby to effect close thermal coupling therebetween. The concept is extended in FIG. 6, where an element 50 is shown comprising an output device 51 and a plurality of associated low-level amplifiers 52, 53, 54 and 55, the latter being disposed within or substantially surrounded by the associated output device 51.

Further modification of the invention will occur to persons skilled in the art and all such modifications are considered to fall within the scope of the invention as defined in the appended claims.

What is claimed is:

1. A stable composite power semiconductor comprising an array of parallel-connected integrated circuits each integrated circuit having an output power device and an associated low-level amplifier having an input and an output, the output of the low-level amplifier being connected to the control terminals of the output power device, at least a portion of the low-level amplifier being in close enough proximity to the power device to provide good thermal coupling therebetween, the output power device and the associated low-level amplifier being interconnected to produce high electrical gain, the thermal coupling producing negative feedback so that a change in power dissipation in the output device causes a change in the low-level amplifier which acts to alter the electric current carried by the output device, the semiconductor being made in the form of a chip in which the critical thermal path between the output power device and its associated low-level amplifier is shorter than the thermal path through the chip between the output power device and a heat sink.

2. A power semiconductor as claimed in claim 1 in the form of a single chip having a thickness of about 10 mils and in which the thermal path between the output power device and its associated low-level amplifier is the order of a few mils.

3. A power semiconductor as claimed in claim 1 in which the electric current being carried by the output device is conducted by heat sinks constituting major elements of the package of the device, the heat sinks providing the terminals through which a load current passes into and out of each of the output devices.

4. A power semiconductor as claimed in claim 1 in which the power device is a semiconductor controlled rectifier and the associated low-level amplifier comprises a transistor connected between the gate and the cathode electrodes of the rectifier.

5. A power semiconductor as claimed in claim 1 in which the power device is a semiconductor controlled rectifier and the low-level amplifier comprises a transistor and a resistance in combination.

6. A power semiconductor as claimed in claim 1 in which the power device is an output transistor and the associated low-level amplifier is a control transistor and a bias resistance in combination.

7. A composite semiconductor as claimed in claim 6 in which the collector of each control transistor is connected to the base of the associated power transistor and the emitters of both the output transistor and the associated control transistor are connected in common, base biasing current being supplied to the output transistor through the bias resistance.

8. A composite power semiconductor as claimed in claim 7 in which each control transistor is disposed within and surrounded by the associated output transistor thereby to effect close thermal coupling of the output transistor and the associated control transistor.

9. A composite power semiconductor as claimed in claim 8 in which the region of power dissipation in the power transistor is the base-to-collector junction and the thermal feedback path is between said junction and the base of the associated control transistor, the average length of said path being the order of a few mils.

10. A composite power semiconductor as claimed in claim 8 comprising an output transistor and a plurality of associated control transistors, the control transistors being disposed within and surrounded by the associated output transistor.

11. A semiconductor device comprising an integrated circuit including an output device and an associated low-level amplifier having an input and an output, the output of the low-level amplifier being connected to the control terminals of the output device, both the output device and the associated low-level amplifier having electric current characteristics that are altered by temperature variations, at least a portion of the low-level amplifier being in close enough proximity to the output device that the temperature of the output power device is at all times substantially equal to the temperature of the associated low-level amplifier, the output device and the associated low-level amplifier being interconnected to produce high electrical gain, the thermal coupling producing negative feedback so that a change in power dissipation and hence in temperature in the output device causes a change in the low-level amplifier which acts through said interconnection to alter the electric current carried by the output device in a manner to prevent thermal instability in the output device, said output device being an output transistor and said low-level amplifier being a control transistor and a bias resistance in combination, the collector and emitter of the control transistor being connected respectively to the base and emitter of the output transistor, the control transistor being disposed within and surrounded by the associated output transistor thereby to effect close thermal coupling of the output transistor to the associated control transistor, the region of power dissipation in the power transistor being the base-to-collector junction and said thermal feedback path being between said junction and the base of the associated control transistor, the length of said path being shorter than the length of the path through the semiconductor to a heat sink.

12. A semiconductor as claimed in claim 11 in which the average length of the path between said junction and the base of the associated control transistor is no greater than one-half the average distance to the heat sink from said junction.

13. A method of fabricating a composite semiconductor comprising an array of parallel-connected integrated circuits each having an output power device and an associated low-level amplifier, both the output device and the associated low-level amplifier having electric current characteristics that are altered by temperature variations, said semiconductor being adapted to be self-protecting against second breakdown, that comprises: fabricating said semiconductor in the form of a chip in which the critical thermal path between the output power device and its associated low-level amplifier is shorter than the thermal path through the chip between the output device and a heat sink, thereby to place the low-level amplifier in close enough proximity to the output device to insure that the temperature of the output device is at all times substantially equal to the temperature of the associated low-level amplifier, and interconnecting the output device and the associated low-level amplifier to produce high electrical gain, thermal coupling producing negative feedback so that a change in power dissipation and hence in temperature in the output device causes a change in the low-level amplifier which acts through said interconnection to alter the electric current carried by the output device in order to prevent thermal instability in the output device.

14. A method as claimed in claim 13 that includes disposing the control portions of said associated amplifier substantially within and surrounded by said output device and maintaining the average length of the path between the power dissipation region of the power device and said control portions at a length no greater than one-half the average distance to the heat sink from said power dissipation region.

* * * * *